B. BORLAND.
MOTOR CONTROL.
APPLICATION FILED MAY 31, 1913.
1,103,027.
Patented July 14, 1914.
2 SHEETS—SHEET 2.
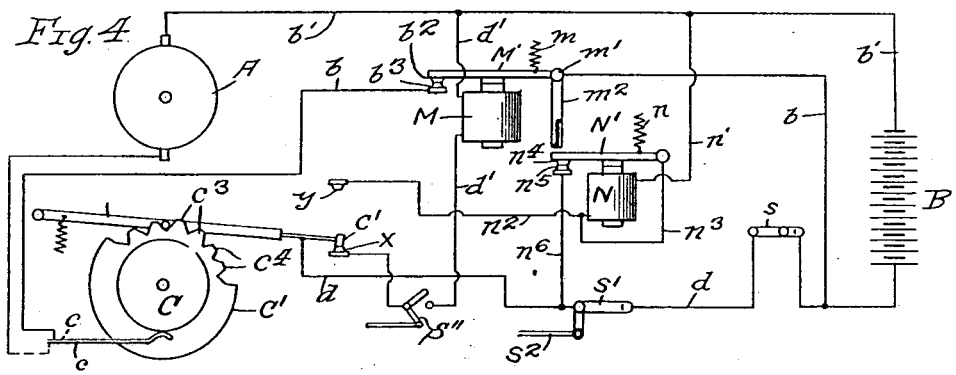
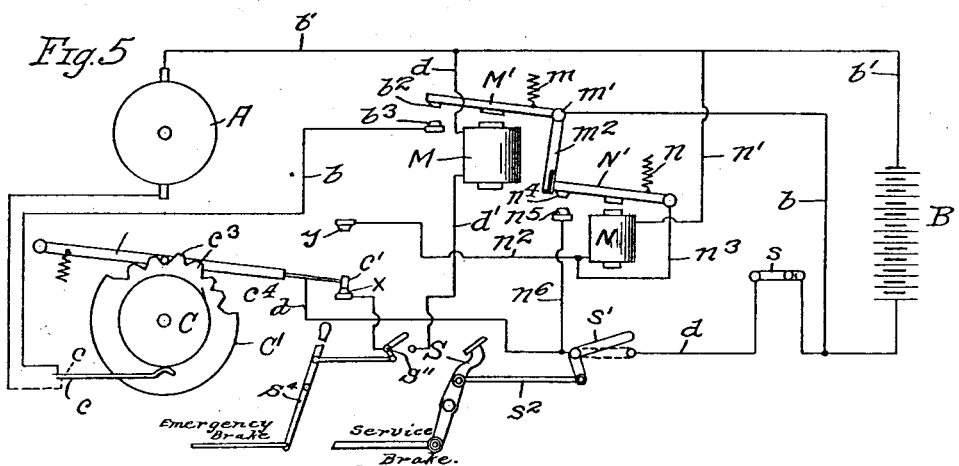
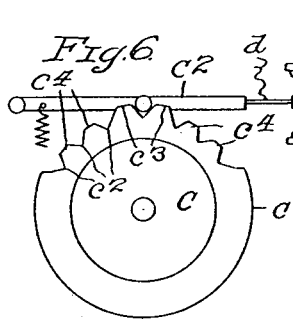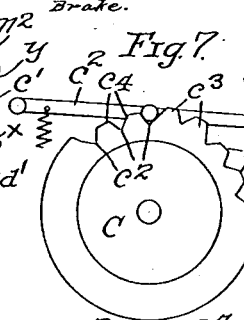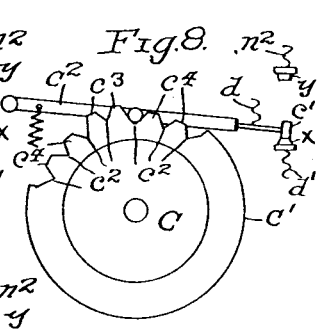

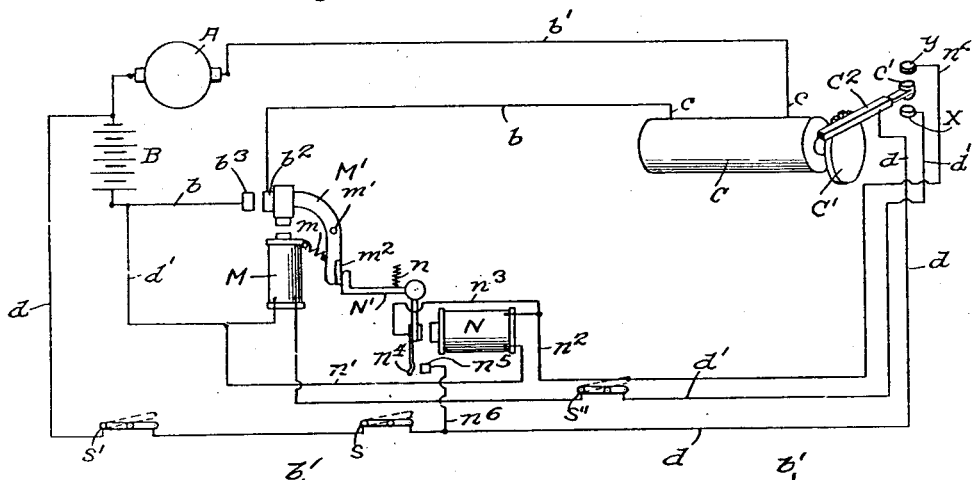
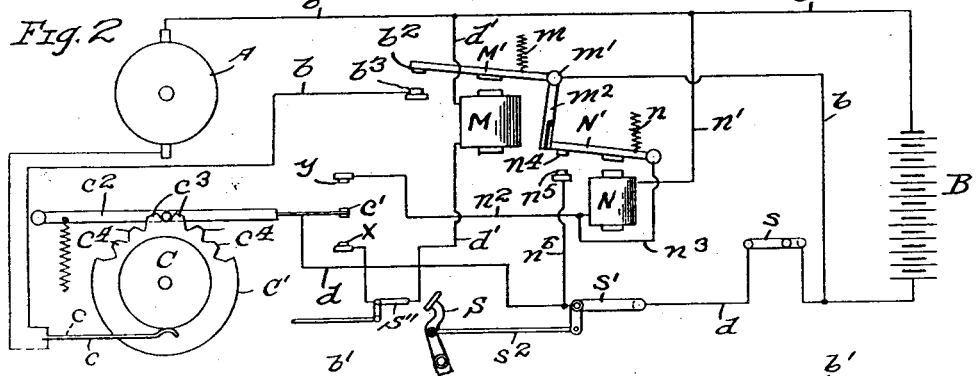
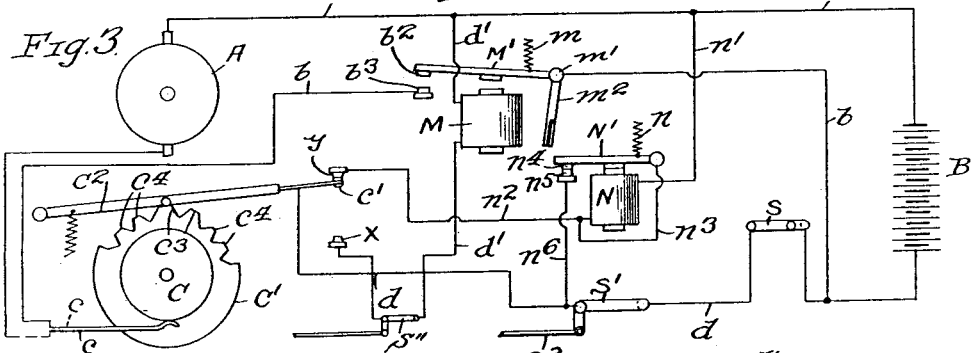

UNITED STATES PATENT OFFICE.

BRUCE BORLAND, OF CHICAGO, ILLINOIS.

MOTOR CONTROL.

1,103,027.

Specification of Letters Patent.  Patented July 14, 1914.

Application filed May 31, 1913.  Serial No. 770,853.

*To all whom it may concern:*

Be it known that I, BRUCE BORLAND, a citizen of the United States, residing at Chicago, in the county of Cook and State of Illinois, have invented certain new and useful Improvements in Motor Control, of which the following is a specification, reference being had therein to the accompanying drawing.

My invention relates to electric motor controllers and consists in the matters hereinafter described and then pointed out in the appended claims.

For convenience of illustration I have shown my invention embodied in mechanism to supply and control electric power to electric motors for vehicles, boats, etc., although the invention is not limited to any particular class of such motors or to any special form of machine operated thereby.

In the drawings Figure 1 is a diagrammatic view of parts and their circuits embodying the features of my invention; Fig. 2 is a similar view showing the parts when the controller is in neutral position and no current flows through the motor circuit; Fig. 3 is a similar view showing the parts when the controller is between neutral and first speed position, either forward or back, to close the control circuit through the switch-interlock device; Fig. 4 is a similar view showing the parts when the controller is in a speed position and before a switch of the control circuit is opened; Fig. 5 is a similar view showing the parts when the controller is in speed position and after the switch of the control circuit is opened and again closed as shown in dotted lines; Figs. 6, 7, 8 and 9 are detail views showing different positions of parts of the controller and controller switch of the control circuit.

In the drawings A indicates an electric motor, B a source of electrical supply, as a battery, for supplying energy or power to the motor through the motor-circuit $b$, $b'$, and C a controller in the circuit having the usual fingers $c$ for regulating the supply of current from the battery to the motor through different resistances or field connections to obtain various speeds of the motor, both forwardly and rearwardly, as the controller handle is turned, all as now well understood in the art. The controller may have the star wheel $C'$ which acts as the controller-lever is operated upon a spring-retracted switch $C^2$ carrying a contact $c'$ at its free end electrically connected with one side of the control circuit. This latter circuit leads by the branch $d$ from the battery to the contact $c'$ and by the branch $d'$ from the other side of the battery through the winding of an electromagnet M having an armature $M'$ in the motor circuit and thence to contact $x$ in the path of the contact $c'$, so that when these contacts engage the control circuit is closed to energize its magnet and in turn close the motor circuit. The control circuit contains a switch $s$ which may be of any suitable form to be opened and closed by the operator, as for example by the lock under the control of the key held by the proper party such as the owner of the automobile, and it also may contain a brake-switch $s'$ operated by a rod $s^2$ from the lever S of suitable brake-mechanism so that when either switch is opened, as for example upon the application of the brake, the control circuit is opened to deënergize the magnet M and open the motor circuit by the action of spring $m$ on the armature $M'$; the organization and operation of the lock and brake switches are well understood and do not require extended description. The armature $M'$ has a contact $b^2$ which engages a contact $b^3$ to close the motor circuit when its magnet M is active or energized, the armature being held away from its magnet by its spring $m$ to normally open the motor circuit at these contacts when its magnet is not active or energized. These parts comprise an electro-magnetically operated switch to close the motor circuit when the magnet M is energized or active and to open the circuit by the force of the spring when it is inactive or deënergized. This switch is held open by an electrically operated interlocking device which may be of any suitable contruction and arrangement for automatic electrical operation, preferably by an electro-magnet in a sub-circuit of the control circuit. The sub-circuit for the interlocking device includes an electro-magnet N having an armature $N'$ retracted from the magnet by a spring $n$, and one end of the magnet winding or wire as at $n'$ is connected to the battery, while its other end $n^2$ leads to a contact $y$ in the path of the controller-switch contact $c'$ and has a branch $n^3$ leading to the armature $N'$ to provide a shunt circuit. In the embodiment shown the armature $M'$ is in the form of a lever pivoted at $m'$ and whose free insulated arm $m^2$ when the armature is attracted by its magnet abuts against the armature $N'$ when the latter is withdrawn by its spring $n$ from its magnet into position to block the movement of the arm. When the switch $C^2$ is moved to close the contacts $c'$ and $y$ the interlocking circuit through the magnet $N$ is closed to attract its armature out of the path of the armature $M'$, so that when the switch is moved to a speed-position of the controller to close the control-circuit through the magnet $M$ the armature $M'$ is attracted to close the motor-circuit. The armature $N'$ is a conductor of electric current and at its free end is provided with a contact $n^4$ adapted when its magnet is energized to close the shunt circuit through a contact $n^5$ of a wire $n^6$ leading to the side $d$ of the control circuit on the opposite side of switches $s$ and $s'$ from the battery B. These parts when in position to close the contacts $n^4$ and $n^5$ provide a shunt circuit around the switch $C^2$ traced from the battery through wires $d$ and $n^6$, contacts $n^4$, $n^5$, armature $N'$, wire $n^3$, magnet $N$, and wire $n'$ back to the battery, and by its energization of magnet $N$ serving to keep this circuit closed until it is broken by opening one of the switches $s$, $s'$.

The controller handle is moved from its zero or neutral position in opposite directions for various speeds, both forwardly and rearwardly, and when it stands at neutral position as indicated in Figs. 2, 6 and 9 no current is supplied to the motor, this relation of the parts being clearly shown in Fig. 2. The star-wheel of the controller is provided with a series of notches $c^2$ in which a lug or projection on the switch $C^2$ is normally seated by the spring-action of the switch, and with a pair of relatively high projections $c^3$ on either side of the neutral or zero notch and with a series of relatively low projections $c^4$ representing various speed positions of the controller. When the controller handle is in zero or neutral position the lug on the switch $C^2$ stands in the notch between the pair of high projections with no current in the motor, this relation of parts being shown in Fig. 2. When the controller handle is moved from neutral position in either direction for forward or backward movement of the motor the controller switch $C^2$ is operated by one of the two high projections $c^3$ on the star-wheel to close the contacts $c'$ and $y$ as shown in Fig. 3 and the switches in the control circuit being closed current flows from the battery through the switch $C^2$ and magnet $N$ in the interlocking sub-circuit whereby the armature $N'$ is attracted to close the contacts $n^4$ and $n^5$ thereby enabling current to flow through the shunt circuit to keep the magnet $N$ energized and its armature $N'$ withdrawn from the path of the armature $M'$ after the contact $c'$ has been moved away from the contact $y$, it being obvious that this shunt circuit will remain operative to hold the interlocking device out of the path of the armature $M$ until it is broken by the opening of one of the switches in the control circuit; this relation of the parts is shown in Fig. 3. As the movement of the controller handle is continued to a speed position the controller switch $C^2$ drops by its spring actuation into one of the recesses $c^2$ of the star wheel, as shown in either Fig. 7 or Fig. 8 according to its direction of movement, when the contact $c'$ engages the contact $x$ to close the control circuit and current flows from the battery D through the magnet $M$ which being energized attracts its armature $M'$ to close the motor circuit, this movement of the armature $M'$ being permitted by the fact that the armature $N'$ of the interlocking device is held out of the path of the armature $M'$ by the operation of the shunt circuit. In this relation of the parts as shown in Fig. 4 the motor is actuated and current continues to flow in all the circuits until the controller switch is moved to open the contacts $c'$ and $x$, or one of the switches of the control circuit is opened. When a switch of the control circuit is opened, as for example by the operation of setting the brake on the driven machine, the control circuit is broken and the current is cut off from the magnets M and N, whereupon their spring-actuated armatures are withdrawn from the magnets to open the switch of the motor circuit and to lock its armature $M'$ from closing again by reason of the armature $N'$ resuming its locking position with respect to it, as shown in Fig. 5. When the switch of the control circuit is again closed as for example by releasing the brake, the interlocking armature $N'$ holds the motor circuit switch open until the controller handle is returned to its neutral or zero position, this relation and result being illustrated in Fig. 5 where the switch of the control circuit is shown closed in dotted lines and the controller switch left in its speed position; as the circuit of the interlocking device remains open it is obvious that the spring $n$ retains the armature $N'$ in the path of the armature $M'$ thereby preventing the latter from closing and maintaining the motor circuit open. From these facts it is apparent that at any time when the control circuit is opened or broken by any of its switches $s$, $s'$ no current will flow to the motor circuit until after the controller and its switch have been returned to neutral position and then operated for that purpose, and that the control circuit is therefore governed by its switch as well as by the controller. Hence if the brake be applied and released without turning the controller from its speed position as delineated in Fig. 5, no current will flow to the motor circuit, but it is necessary for the operator to turn the controller to its neutral position in order to close the sub-circuit through the magnet N before the motor switch can again be closed to supply current to the motor circuit when the controller is next operated for that purpose. Also, as at any time when the current in the control circuit is broken no current can again flow to the motor circuit until after the controller has been returned to its neutral position, if any break occurs in the circuit and the controller is accidentally left on at any speed no current will flow to the motor circuit when the break is repaired to suddenly readmit the current to the motor. When the controller is returned to its neutral position the interlocking circuit is again closed and its magnet N is kept energized by the current through the shunt circuit, so that when the controller is moved to speed position the motor circuit will again be closed. It is therefore apparent that the interlocking circuit is closed solely by the controller when moved from its neutral position and is opened solely by opening or breaking the control circuit, as for example by opening its brake-operated switch or lock switch.

When the controller moves between speed positions the switch $C^2$ is moved to neutral position as shown in Fig. 9 by reason of the speed projections $c^4$ on the star-wheel being lower than projections $c^3$ before the controller moves far enough to break any of the connections made by the controller fingers to the motor circuit and this circuit is opened by the breaking of contacts $c'$ and $x$, although the shunt circuit remains closed, by reason of which facts the motor circuit is opened between changes of speed so there is no burning on the controller as it changes from one set of connections to another, while the shunt circuit remains closed so that the interlock device is inoperative and will allow the motor circuit switch represented by magnet M and its armature to freely make and break the motor circuit as the controller is moved from one speed position to another. In other words between different speed positions of the controller before any contact is broken on the controller drum the switch $C^2$ moves to neutral position and the motor circuit is temporarily opened by opening connections $b^2$, $b^3$. The controller switch has three different operations, making contact between its neutral position and first speed position in either direction to close the interlocking circuit, contact at any speed position to close the control circuit, and standing between its contacts to prevent burning on the controller during changes of motive force in the motor circuit or between different rates of speed of the driven machine. The government of the control circuit by opening its line switch or by derangement of the circuit opens the secondary circuits and shuts off the current to the motor circuit, and even if the control circuit switch is closed current can be restored to the motor circuit only by returning the controller to its zero or neutral position so that power is not applied to the motor at any considerable strength with resultant damage to the mechanism and sudden starting of the machine but will be applied beginning at the zero or minimum point and gradually increasing until the desired motive power is reached. After the interlocking circuit is closed the shunt circuit remains closed through the magnet N as long as the control circuit switch remains closed, but the opening of this switch cuts off all the current irrespective of the position of the controller.

The switch $s'$ is ordinarily intended to be attached to the emergency brake which is usually supplied with a ratchet which may be applied to hold the brake in set position, as when leaving the car standing on a grade, so that when the brake is released by the operator without his having first returned the controller to neutral position the car will not start ahead on account of the action of the interlock $N'$ as the motor circuit can not be closed until after the controller has been returned to neutral position to energize magnet N. This is also the case when the operator unlocks the car by closing switch $s$, which is ordinarily a key-operated switch. In case the operator might wish his car arranged so that by applying the service-brake lightly the motor circuit would be opened and the car allowed to coast, analogous to throwing out the clutch in a gasolene car, a switch $s''$ is provided which may be connected with the service brake lever. This switch $s''$ is located on line $d'$ of the control circuit between contact $x$ on that line and the point where line $d'$ joins $b'$, as illustrated in Figs. 3, 4 and 5. In this way it will be seen that by moving the service-brake $s^4$ just enough to open switch $s''$, but not enough to apply the brake, the current through magnet M will be broken and the motor circuit opened at $b^2$, $b^3$ and the car will coast along without power although the controller is in a speed position and by releasing the service brake the operator may again apply power to the motor without moving the controller handle, as by releasing the service-brake the control circuit through magnet M is again closed and by armature $M'$ being attracted to its magnet M the motor circuit is closed. This switch being located on line $d'$ between contact $x$ and the point where line $d'$ joins $b'$ it will be seen that opening it only breaks the current through magnet M and has no effect on the current through magnet N or the shunt $n^4$, $n^5$.

I claim:—

1. The combination of an electric motor, a current-supply circuit therefor, an electrically-operated switch for the supply-circuit, an electro-responsive actuator therefor, a control circuit in which said actuator is included, an electrically-operated lock normally holding the switch open, a controller and electrical means operating to withdraw said lock and permit said switch to be closed when the controller passes from neutral to speed position.

2. The combination of an electric motor, a current-supply circuit therefor, an electrically operated switch for the supply-circuit, a control circuit in which actuating means for the switch is included, an electrically-operated lock holding the switch open, a controller, electrical devices for withdrawing said lock and for closing the switch when the controller passes from neutral to speed position, a shunt-circuit including an actuating device for holding the lock closed, and a switch to open the supply circuit.

3. The combination of an electric motor, a current-supply circuit therefor, an electrically operated switch for the supply-circuit normally held open by spring tension, a control circuit having an electro-magnet to close the switch of the supply-circuit, a second electro-magnet having an armature to block the closing of the switch when the magnet is deënergized, conductors leading from the control-circuit to the second magnet, a controller and means to cause both magnets to be energized when the controller passes from neutral to speed position.

4. The combination of an electric motor, a current-supply circuit therefor, a switch for the supply-circuit comprising an electromagnet whose armature is normally held open by a spring, a control circuit in which the magnet is included, a second electromagnet whose armature blocks the closing of the armature of the first magnet when the second magnet is deënergized, conductors leading from the control circuit to the second magnet, a shunt circuit including said second magnet, a controller, means actuated by the controller to cause both magnets to be energized when the controller passes from neutral to speed position, and a switch to open the supply circuit.

5. The combination of an electric motor, a current-supply circuit therefor, a switch for the supply-circuit, means tending to open said switch, a control circuit including actuating means to close the switch, an electrically-operated lock in a shunt to the control circuit to normally hold the switch open, and electrical means releasing the lock and permitting the switch to be closed upon the closing of a switch in the control circuit.

6. The combination of an electric motor, a current-supply circuit therefor, an electrically operated switch for the supply-circuit, means tending to open said switch, an electrically-operated lock to hold the switch open when released, and means for deënergizing said electrically operated switch and permitting it to open upon the application of a brake.

7. The combination of an electric motor, a current-supply circuit therefor, a normally-open switch for the supply-circuit, a control circuit including actuating means for the switch, an electrically-operated device to interlock with the switch when the latter is open, a circuit including actuating means for the interlocking device, a controller, and means operated solely by the controller to close said interlocking device circuit.

8. The combination of an electric motor, a current-supply circuit therefor, a normally-open switch for the supply-circuit, an electrically-operated device to interlock with the switch when the latter is open, a circuit including actuating means for the interlocking device to hold the latter out of engagement with the switch, a switch in the control circuit, a controller, and means to close the circuit of said actuating means when the controller passes from neutral to speed position.

9. The combination of an electric motor, a motor circuit, a controller therefor, a normally-open electrically operated switch for the motor circuit, a control circuit including actuating means for said switch, an electrically-operated lock to hold said switch open, a circuit including actuating means for said lock, and means operated by the controller to close the last named circuit to withdraw the lock when the controller passes from neutral position to current-supply position and to close the control circuit when the controller is in said current-supply position.

10. The combination of an electric motor, a motor circuit, a controller therefor, a normally-open electrically operated switch for the motor circuit, a control circuit including actuating means for said switch, an electrically-operated lock device to hold said switch open, a circuit in shunt to the control circuit including actuating means for said lock, and means operated by the controller to open said shunt circuit when the controller is in neutral position and to close said control circuit when the controller is in current-supply position.

11. The combination of an electric motor, a circuit therefor, an automatic electromagnetically-operated switch for said circuit, a control circuit including actuating means for said switch, the motor circuit being opened when said actuating means is deënergized, an electrically-operated lock to hold said switch open, a circuit in shunt to the control circuit including actuating means for the lock, a controller having a switch operating to close the shunt circuit to withdraw the lock only when the controller is moved from the zero or neutral position.

12. The combination of an electric motor, a circuit therefor, an automatic electro-magnetically-operated switch for said circuit, a control circuit including actuating means for said switch, means for opening the control circuit upon the application of a brake, an electrically-operated lock to hold said switch open, a circuit in shunt of the control circuit including actuating means for the lock, a controller having a switch operating to close the shunt circuit to withdraw the lock only when the controller is moved from the zero or neutral position.

13. The combination of an electric motor, a circuit therefor, an automatic electro-magnetically operated switch for said circuit, a control circuit including actuating means for said switch, and means to open the motor circuit upon the application of a brake, an electrically operated lock to hold the switch open, a circuit including actuating means for the lock, a controller having a switch in said control and lock actuating circuits and operating to close the lock actuating circuit only when the controller is moved from the zero or neutral position and to close the control circuit when in current-supply position.

14. The combination of an electric motor, a circuit therefor, an automatic electro-magnetically-operated switch for said circuit, a control circuit including actuating means for said switch and means to open the motor circuit upon the application of a brake, an electrically operated lock to hold the switch open, a circuit in shunt to the control circuit including the lock actuating means, a controller having a switch in said control and lock actuating circuits and operating to close the lock actuating circuit only when the controller is moved from the zero or neutral position and to close the control circuit when in current-supply position.

15. The combination of an electric motor, a motor circuit, an electrical switch therefor, a controller having a switch adapted to take three positions, a control circuit including the motor circuit switch and the controller switch, an electrically operated lock to hold the motor circuit switch open, a lock actuating circuit including the controller switch, and means on the controller to close its switch with the lock actuating circuit only when the controller is moved from neutral position and to close the control circuit when in current-supply position and to open both circuits when changing from one current-supply position to another.

16. The combination of an electric motor, a motor circuit, an electrical switch therefor, a controller having a switch adapted to take three positions, a control circuit including the controller switch and actuating means for the motor circuit switch, an electrically operated lock to hold the motor circuit switch open, a lock actuating circuit including the controller switch, a shunt circuit including actuating means for the lock, means on the controller to close its switch with the lock actuating circuit only when the controller is moved from neutral position and to close the control circuit when in current-supply position and to open both circuits when changing from one current-supply position to another, and a switch in the control circuit.

17. The combination of an electric motor, a current-supply circuit therefor, an electro-magnetically-operated switch for the supply-circuit, a control circuit in which the magnet of the switch is included, a second electro-magnet whose armature blocks the closing of the armature of the first magnet when the second magnet is deënerigized, a circuit in shunt to the control circuit including said second magnet, a controller, means actuated by the controller to cause both magnets to be energized when the controller passes from neutral to speed position, and a service switch in the control circuit beyond the shunt adapted to break the control circuit without affecting the shunt circuit.

In testimony whereof I affix my signature in presence of two witnesses.

BRUCE BORLAND.

Witnesses:
EDITH WILCOX,
J. McROBERTS.